United States Patent
Reiff et al.

[15] 3,684,759
[45] Aug. 15, 1972

[54] PROCESS FOR THE PREPARATION OF MODIFIED EMULSION POLYMERS WITH OLIGOURETHANE SALT

[72] Inventors: Helmut Reiff, Cologne-Flittard; Dieter Dieterich; Frank Wingler, both of Leverkusen, all of Germany

[73] Assignee: Farbenfabriken Bayer Aktiengesellschaft, Leverkusen, Germany

[22] Filed: Oct. 21, 1970

[21] Appl. No.: 82,796

[30] Foreign Application Priority Data

Oct. 23, 1969 Germany..........P 19 53 349.4

[52] U.S. Cl....260/29.6 NR, 117/161 KP, 260/2.5 R, 260/8, 260/17.3, 260/17.4 R, 260/23 EM, 260/28, 260/29.4 UA, 260/29.7 NR, 260/77.5 QU
[51] Int. Cl.............................................C08f 45/24
[58] Field of Search .260/29.6 R, 29.6 NR, 20.6 MN, 260/29.60 L, 29.7 R, 29.7 NR, 77.5 QU

[56] References Cited

UNITED STATES PATENTS

| | | |
|---|---|---|
| 3,249,654 | 5/1966 | von Bonin et al..........260/874 |
| 3,388,087 | 6/1968 | Dieterich et al. ...260/77.5 QU |
| 3,427,192 | 2/1969 | Bolinger.............260/29.6 NR |
| 3,479,310 | 11/1969 | Dieterich et al....260/29.6 NR |
| 3,491,050 | 1/1970 | Keberle et al......260/77.5 QU |
| 3,491,051 | 1/1970 | Elkin et al..........260/29.6 NR |
| 3,539,483 | 11/1970 | Keberle et al......260/29.6 NR |

Primary Examiner—Harold D. Anderson
Attorney—Robert A. Gerlach and Sylvia Gosztonyi

[57] ABSTRACT

A process is provided for the preparation of aqueous dispersions of polymers of olefinically unsaturated monomers in the presence of emulsifiers capable of forming free radicals which emulsifiers contain urethane groups, characterized in that
  5 to 95 percent by weight of at least one polymerizable olefinically unsaturated monomer is polymerized in the presence of
  5 to 95 percent by weight of one or more oligourethane salts having an average molecular weight of 1,500 to 20,000 (preferably 2,000 to 10,000) and a tensile strength of less than 20 kg wt/cm², which salts have been prepared from water-insoluble oligohydroxy compounds having a molecular weight of 400 to 5,000.

17 Claims, No Drawings

PROCESS FOR THE PREPARATION OF MODIFIED EMULSION POLYMERS WITH OLIGOURETHANE SALT

The preparation of polymers and copolymers from vinyl monomers by emulsion polymerization is already known. In such processes, one or more vinyl monomers are emulsified in water and polymerization is initiated by the addition of starters. Emulsifiers are necessary in order to emulsify the hydrophobic monomers and insure that the latex formed when polymerization is completed is stable. The substances used as emulsifiers are soap-like, low molecular weight compounds which have a hydrophilic center in addition to a hydrophobic radical. Such compounds are disadvantageous because they are very hydrophilic, they often have poor compatibility with the polymer formed and because of very low molecular weights which generally range between about 100 and 300 they tend to migrate. For these reasons the films and the coatings obtained by drying emulsion polymer latices are microheterogeneous and have poor resistance to water.

Some improvement has been achieved by using monomers which enable polymers containing ionic centers to be formed such as acrylic acid, vinyl sulphonic acid and dialkyl aminoalkyl acrylates. The latices thus formed are stable even in the absence of emulsifiers. Nevertheless, the use of emulsifiers cannot be dispensed with even in these cases since the monomers must be emulsified before polymerization. The addition of the usual emulsifiers invariably involves the introduction of low molecular weight, extractable materials into the polymer which are undesirable and detrimental to the properties of the polymer and which remain unchanged in the polymer during and after the secondary reactions.

It is also known that polymerization may be carried out in the presence of high molecular weight cationic polyurethanes which act as emulsifiers and which contain quaternary ammonium or tertiary sulphonium groups. However, these polyurethanes are high molecular weight elastic synthetic resins and, as such, have tensile strengths of 100 to 300 kg wt/cm$^2$. The dispersions are prepared by a special process in which a high molecular weight, predominantly linear polyurethane is alkylated in an organic solvent, after which the organic solvent is distilled off or replaced by water. Although such a process entails considerable time and expense, the emulsifying effect achieved is nevertheless often unsatisfactory because the surface tension of the aqueous sols and dispersions obtained is often greater than 40 dynes/cm (see German Pat. Nos. 1,184,946; 1,178,586 and German document laid open to inspection No. 1,544,892). Furthermore, high molecular weight anionic polyurethanes prepared from bis-chlorocarbonic acid esters and diamino sulphonic acids which have been proposed as emulsifiers do not have a specifically hydrophobic segment so that their emulsifying effect is low compared to styrene, vinyl chloride or butyl acrylate, for example. Moreover, they are unsuitable for use in emulsion polymerization for economic reasons (see German Auslegeschrift No. 1,044,404).

Lastly, interfacial surface active urethane salts which have been prepared by reacting hydrophobic higher alkyl isocyanates with, for example, salts of aminocarboxylic acid or sulphonic acids are known. These salts are mono- or di-urethanes which contain the usual structure of emulsifiers and have molecular weights below 600 [see E. Ulsperger, Tenside 3, 1 (1966)].

It is therefore an object of this invention to provide stable aqueous polymer dispersions and a method for preparing them which are devoid of the foregoing disadvantages.

Another object of this invention is to provide stable aqueous polymer dispersions and a method for preparing them which does not require the use of an emulsifier.

Still another object of this invention is to provide stable dispersions of modified polymers obtained by the emulsion polymerization of olefinically unsaturated monomers.

A still further object of this invention is to provide stable aqueous dispersions of polymers which have improved elasticity and abrasion resistance as well as a reduced tendency to swell in organic solvents.

The foregoing objects and others which will become apparent from the following description are accomplished in accordance with this invention, generally speaking, by providing a process for the preparation of aqueous dispersions of polymers from olefinically unsaturated monomers in the presence of radical-forming emulsifiers which contain urethane groups, characterized in that from about 5 to about 95 percent by weight of at least one polymerizable olefinically unsaturated monomer is polymerized in the presence of from about 5 to about 95 percent by weight of one or more oligourethane salts which have an average molecular weight of from about 1,500 to about 20,000 (preferably 2000 to 10,000) and a tensile strength of less than about 20 kg wt/cm$^2$. The oligourethane salts are prepared from oligohydroxy compounds which are insoluble in water and have molecular weights of from about 400 to about 5,000.

The problems involved in the preparation of stable dispersions of modified polymers from olefinically unsaturated monomers are solved by using oligourethane salts prepared from oligohydroxy compounds which are insoluble in water as emulsifiers for the emulsion polymerization of olefinically unsaturated monomers. The emulsifiers may be used satisfactorily even in high concentrations without adversely affecting the polymers formed. In many cases, the use of these new emulsifiers even results in an improvement of the properties of the polymers, e.g., an improvement in the elasticity and the abrasion resistance, as well as a reduction of the tendency of the polymers to swell in organic solvents. The oligourethane salts not only serve as emulsifiers but also bring about a modification of the olefin polymer.

As oligourethane is meant compounds which contain a statistical average of at least two and not more than about 10 urethane groups. If urea groups are present as well as urethane groups, the total of the two groups should not be more than about 10 and products which contain three to eight such groups are preferred. The average molecular weight of the oligourethanes is at least about 1,500 and at the most about 20,000 and molecular weights of between 2,000 and 10,000 are preferred. Accordingly, oligourethanes are not polyurethane macromolecules and they do not have the character of synthetic resins. The tensile strength of the oligourethanes in the dry state is in all cases less than about 20 kg wt/cm$^2$ and preferably below about 5 kg wt/cm$^2$. In most cases, oligourethanes are plastic products which have a high viscosity but which do not form self-supporting films.

1. Any compound containing at least two groups reactive with isocyanate groups may be used to prepare the oligourethane salts of this invention. Some such suitable materials include compounds that contain terminal hydroxyl groups and have molecular weights of between about 400 and about 5,000, preferably polyethers, polyacetals, polythioethers, polyesters, polyether esters, polyamides and polyester amides. Hydrocarbons containing hydroxyl groups such as polybutadiene with terminal hydroxyl groups are also suitable.

As polyethers one may employ, for example, the polymerization products of styrene oxide, ethylene oxide, propylene oxide, tetrahydrofuran, butylene oxide, epichlorohydrin, their copolymerization or graft polymerization products and the like, as well as the polyethers obtained by condensation of polyhydric alcohols or mixtures thereof and by the alkoxylation of polyhydric alcohols, amines, polyamines and amino alcohols. Isotactic polypropylene glycol may also be used. Products which have a high alkylene oxide content are unsuitable if they give rise to water-soluble polyurethanes.

As polyacetals one may employ, for example, compounds prepared from glycols such as diethylene glycol, triethylene glycol, 4,4'-dihydroxy-ethoxy-diphenyldimethyl-methane, hexanediol and formaldehyde. Suitable polyacetals may also be prepared by the polymerization of cyclic acetals.

Some polythioethers which are particularly suitable are the condensation products of thiodiglycol with itself and/or with other glycols, dicarboxylic acids, formaldehyde, aminocarboxylic acids or amino alcohols. Depending on the coreactant employed, the products may be mixed polythioethers, polythioether esters or polythioether ester amides. Polyhydroxy compounds of this type may also be used in their alkylated form or in admixture with alkylating agents.

As polyesters, polyester amides and polyamides one may use the predominantly linear or branched condensates obtained from polyvalent saturated and unsaturated carboxylic acids or their anhydrides and polyvalent saturated and unsaturated alcohols, amino alcohols, diamines, polyamines and mixtures thereof and also e.g., polyterephthalates or polycarbonates. Polyesters of lactones, e.g., of e-caprolactone or of hydroxycarboxylic acids may also be used. The polyesters may contain hydroxyl or carboxyl end groups. The alcohol reactants used in the synthesis of these materials may also consist either entirely or partly of higher molecular weight polymers or condensates, e.g., polyethers, polyacetals and polyoxymethylenes. Unsaturated polyesters may be grafted with vinyl monomers.

Some suitable components for the synthesis of polyesters include, for example, ethylene glycol, diethylene glycol, triethylene glycol, tetraethylene glycol, 1,2-propylene glycol, 1,3-propylene glycol, butane-2,3-diol, butane-1,4-diol, pentane-1,5-diol, hexane-1,6-diol, 2,2-dimethylpropane-1,3-diol, cyclohexane dimethanol, quinitol, glycerol, trimethylol propane, hexanetriol, pentaerythritol, butenediol, bis-hydroxyethyldiane, succinic acid, glutaric acid, adipic acid, suberic acid, phthalic acid, isophthalic acid, terephthalic acid, dimethyl terephthalate, bis-glycol terephthalate, maleic acid anhydride, fumaric acid, 6-hydroxy-caproic acid, 4-hydroxybenzoic acid, trimellitic acid and the like and mixtures thereof.

Polyhydroxy compounds which contain urethane or urea groups as well as optionally modified natural polyols such as castor oil or carbohydrates may also be used.

In principle, any polyhydroxy compounds which contain basic nitrogen atoms may be used, e.g., polyalkoxylated primary amines or polyesters of polythioethers which contain alkyl diethanolamine by condensation. Compounds which contain reactive halogen atoms may also be incorporated by condensation, e.g., glycerol-a-chlorohydrin. Such compounds may also be present in alkylated, i.e., onium form. Polyesters which have built-in sulphonate or carboxylate groups as described, for example, in U.S. Pat. application Ser. No. 869,949, filed on Oct. 27, 1969, now abandoned, may also be used. Any of the active hydrogen containing compounds suggested in U.S. Pat. No. 3,201,372 may be used. Mixtures of various polyhydroxy compounds may be used to vary the lyophilic or hydrophobic character and mechanical properties of the products of the process.

2. Any aromatic, aliphatic and cycloaliphatic diisocyanates may be used to prepare the oligourethanes of this invention including, e.g., 1,5-naphthylene diisocyanate, 4,4'-diphenylmethane diisocyanate, 4,4'-diphenyldimethylmethane diisocyanate, di- and tetra-alkyldiphenylmethane diisocyanate, 4,4'-dibenzyl diisocyanate, 1,3-phenylene diisocyanate, 1,4-phenylene diisocyanate, the isomers of tolylene diisocyanate, optionally as mixtures, 1-methyl-2,4-diisocyanato-cyclohexane, 1,6-diisocyanato-2,2,4-trimethylhexane, cyclohexane-1,4-diisocyanate, dicyclohexylmethane diisocyanate, 1-isocyanatomethyl-3-isocyanato-1,5,5-trimethylcyclohexane, chlorinated and brominated diisocyanates, diisocyanates which contain phosphorus, 4,4'-diisocyanatophenyl-perfluoroethane, tetramethoxybutane-1,4-diisocyanate, butane-1,4-diisocyanate, hexane-1,6-diisocyanate, ethylene diisocyanate, p-xylylene diisocyanate, m-xylylene diisocyanate and the hydrogenation products of the aromatic diisocyanates mentioned above. Urethane di- or tri-isocyanates and biuret di- or tri-isocyanates may also be used, e.g., addition products of hexane-1,6-diisocyanato, xylylene-1,3-diisocyanate or 1-methyl-2,4-diisocyanato-cyclohexane with water or amines or polyalcohols; also isocyanates which contain ionic groups and which may be prepared, for example, by the addition of isocyanates which contain reactive halogen atoms to ditertiary and polytertiary amines, bis-isocyanatoethylphthalate, diisocyanates which contain reactive halogens atoms such as 1-chloromethylphenyl-2,4-diisocyanate, 1-bromomethylphenyl-2,6-diisocyanate or 3,3-bis-chloromethyl ether-4,4'-diphenyl diisocyanate.

Any of the isocyanates suggested in U.S. Pat. No. 3,350,362 may also be used and aliphatic and araliphatic diisocyanates and the isomers of tolylene diisocyanate are particularly preferred.

3. Any glycols, amino alcohols or diamines containing salt groups or groups which are converted into salt groups by simple alkylation or neutralization reactions (potential salt groups) may be used to prepare the oligourethane salts of this invention. These include:

a. Glycols or diamines which contain tertiary amino groups, e.g., mono-, bis- or poly-alkoxylated aliphatic, cycloaliphatic, aromatic or heterocyclic primary amines such as N-methyl diethanolamine, N-ethyl diethanolamine, N-propyl diethanolamine, N-isopropyl diethanolamine, N-butyl diethanolamine, N-isobutyl diethanolamine, N-oleyl diethanolamine, N-stearyl diethanolamine, ethoxylated amine of coconut oil, N-allyl diethanolamine, N-methyl-diisopropanolamine, N-ethyl-diisopropanolamine, N-propyl-diisopropanolamine, N-butyl-diisopropanolamine, N-cyclohexyldiisopropanolamine, N,N-diethoxyaniline, N,N-diethoxytoluidine, N,N-diethoxy-a-aminopyridine, N,N'-diethoxypiperazine, dimethyl-bis-ethoxy-hydrazine, N,N'-bis-(b-hydroxyethyl)-N,N'-diethyl-hexahydro-p-phenylene diamine, N-b-hydroxyethyl piperazine, polyalkoxylated amines such as propoxylated methyl diethanolamine; also compounds such as N-methyl-N,N-bis-g-aminopropylamine, N-(g-aminopropyl)-N,N'-dimethylethylene diamine, N-(g-aminopropyl)-N-methyl ethanolamine, N,N'-bis-(g-aminopropyl)-N,N'-dimethylethylene diamine, N,N'-bis-(g-aminopropyl)-piperazine, N-(b-aminoethyl)-piperazine, N,N'-bis-ethoxypropylene diamine, 2,6-diaminopyridine, diethanolamine-acetamide, diethanolamine-propionamide, N,N-bis-ethoxyphenyl-thiosemicarbazide, N,N-bis-ethoxymethylsemicarbazide, p,p'-bis-aminomethyl-dibenzylmethylamine, 2,6-diaminopyridine and 2-methyl-3-aminopropyl-aminoethanol-(1).

b. Glycols or diamines which contain sulphide groups such as thiodiglycol or bis-2-aminoethyl sulphide.

c. Glycols or diamines which contain quaternizable halogen atoms or R—SO$_2$ groups, for example glycerol-a-chlorohydrin, glycerol monotosylate, pentaerythritol-bis-benzene sulphate, glycerol monomethane sulphonate, addition products of diethanolamine or of chloromethylated aromatic isocyanates or aliphatic haloisocyanates such as N,N-bis-hydroxyethyl-N' -m-chloromethylphenyl urea, N-hydroxyethyl-N'-chlorohexyl urea, glycerol monochloroethyl urethane, bromoacetyl dipropylene triamine or chloroacetic acid diethanolamide.

d. Hydroxy or aminocarboxylic acids such as glyceric acid, dihydroxymaleic acid, dihydroxyfumaric acid, tartaric acid, citric acid, serine ornithine, histidine, lysine, proline, aspartic acid, glutamic acid, oxaluric acid, anilidoacetic acid, anthranilic acid, 2-ethylaminobenzoic acid, 3-aminobenzoic acid, 4-aminobenzoic acid, N-phenylaminoacetic acid, 3,4-diaminobenzoic acid, 5-aminobenzene-dicarboxylic acid or 2-aminoethyl-aminoethane carboxylic acid.

e. Hydroxy or aminosulphonic acids, such as 1,4-butanediol-2-sulphonic acid, taurine, 4,6-diaminobenzene-disulphonic acid-(1,3), 2,4-diaminotoluene-sulphonic acid-(5), 4,4'-diaminodiphenyl-disulphonic acid-(2,2'), 2-aminophenol-sulphonic acid-(4), 4,4'-diamino-diphenyl ether-sulphonic acid-(2), 2-aminoanisole-N-methane sulphonic acid, 2-aminodiphenylamine sulphonic acid, ethylene glycol sulphonic acid, 2,4-diaminobenzene sulphonic acid or 6-aminohexyl-aminopropane sulphonic acid.

f. Hydroxy or aminophosphinic acids, hydroxy or aminophosphonic acids, hydroxy or aminophosphorous acid esters or hydroxy or aminophosphoric acid esters, e.g., bis-(a-hydroxyisopropyl)-phosphinic acid, hydroxyalkane phosphonic acid, bis-glycol esters of phosphorous acid, bis-glycol ester of phosphoric acid or bis-propylene glycol ester of phosphoric acid.

4. Any chain breaking monoisocyanates including those listed in U.S. Pat. No. 3,350,362 such as methyl isocyanate, ethyl isocyanate, phenyl isocyanate, methoxymethyl isocyanate, 2-chloroethyl isocyanate, 6-chlorohexyl isocyanate, m-chloromethylphenyl isocyanate and the like may be used in the preparation of the oligourethane of this invention.

5. Any chain breaking compounds which are monofunctional with respect to isocyanates and which contain (potential) salt groups may be used in the preparation of the oligourethanes of this invention including:

a. Tertiary amines, e.g., N,N-dimethyl ethanolamine, N,N-diethyl ethanolamine, 1-dimethylaminopropanol-(2), N-ethoxymorpholine, N-methyl-N-b-hydroxyethylaniline, N-ethoxypiperidine, a-hydroxyethyl-pyridine, g-hydroxyethylquinoline, N,N-dimethylhydrazine, N,N-dimethylethylene diamine, 1-diethylamino-4-aminopentane, a-aminopyridine, 3-amino-N-ethylcarbazole, N,N-dimethylpropylene diamine, N-aminopropyl piperidine, N-aminopropyl morpholine, N-aminopropyl ethylene imine, 1,3-bis-piperidino-2-aminopropane or dimethylaminopropyl urea.

b. Sulphides, e.g., 2-hydroxyethyl methyl sulphide.

c. Alkylating agents such as 2-chloroethanol, 2-bromoethanol, chloroacetamide, chloroacetic acid and bromoacetic acid.

d. Hydroxy or aminocarboxylic acids which have a chain breaking action, e.g., glycollic acid, lactic acid, glycine, a- and b-alanine, 6-aminocaproic acid, 4-aminobutyric acid, sarcosine, 2-hydroxy-ethanol sulphonic acid, sulphanilic acid, taurine, methyltaurine, butyltaurine, aminomethane sulphonic acid, 3-aminobenzoic acid, 4-aminobenzoic acid, phenol sulphonic acid-(3), phenol disulphonic acid-(2,4), aminoethanol sulphuric acid monoester, 3-aminopropane sulphonic acid, 4-aminobutane sulphonic acid, 3-methylaminopropane sulphonic acid, succinic acid mono-2-hydroxyethyl amide, dihydroxymaleic acid monoamide, tartaric acid monoureide, citric acid monoamide and citric acid diamide, citric acid monoureide and citric acid diureide, tartaric acid amide, asparagine, glutamine, aspartic acid monoureide, glutamic acid monoureide, ureidosuccinic acid, acetamide-C-sulphonic acid, acetylurea-C-sulphonic acid, acetylguanidine-C-sulphonic acid, propionyl urea-a-sulphonic acid, propionamide-a-sulphonic acid, butyramide-a-sulphonic acid, isobutyramide-a-sulphonic acid, acetoguanamine sulphonic acid, N-methyl-asparagine, N-methyl-aspartic acid ureide, N-hydroxyethyl-asparagine and N-hydroxyethyl-aspartic acid ureide. Addition products of amino amides or amino ureides with a,b-unsaturated carboxylic acids, addition products of aminocarboxylic acids of aminosulphonic acids with a,b-unsaturated carboxylic acid amides or carboxylic acid ureides, N-carbonamidomethyl glycine, N-carbonamidomethyl anthranilic acid, carboxymethylaminoacetyl urea, addition products of sultones and b-lactones such as b-propiolactone with ureas and carbonamides, such as 3-ureidopropane sulphonic acid, 3-ureidobutane sulphonic acid, 2-ureidopropionic acid and a-dimethylamino-b-hydroxypropionamide.

6. Any chain breaking agents which do not have the character of (potential) salts may be used in the preparation of the oligourethane of this invention including methanol, ethanol, isopropanol, glycol monomethyl ether, diethylene glycol monomethyl ether, dibutyl amine, acetic acid, urea, thiourea, sulphamide, methyl urea, oxamide, ethylene urea, dicyandiamide, glycollic acid amide, glycine amide, hydrazine acetamide, 2-hydroxyethyl urea, 2-hydroxyisopropyl urea, succinic acid amide, succinic acid mono-ureide, 6-aminocaproic acid amide, 11-aminoundecanoic acid amide, phthalic acid monoamide, glycide, 3-ethyl-3-hydroxymethyloxetane, 3-methyl-3-hydroxymethyloxetane and glycerol-1,3-dimethyl ether.

7. Any monofunctional alkylating agents which will convert the basic reactants into the salt form may be used including, for example, methyl chloride, methyl bromide, methyl iodide, ethyl bromide, propyl bromide, butyl bromide, dimethyl sulphate, diethyl sulphate, methyl chloromethyl ether, methyl-1,2-dichloroethyl ether, ethylchloromethyl ether, benzyl chloride, benzyl bromide, p-chlorobenzyl chloride, trichlorobenzyl chloride, p-nitrobenzyl chloride, ethylene chlorohydrin, ethylene bromohydrin, epichlorohydrin, ethylene oxide, propylene oxide, styrene oxide, benzene sulphonic acid ester, toluene sulphonic acid ester, naphthalene sulphonic acid ester, w-bromoacetophenone, dinitrochlorobenzene, d-chloropentenamide, chloroacetic acid and esters and amides thereof, chloromethyl dimethylethoxy silane, pentamethylchloromethyldisiloxane, pentamethylbromomethyldisiloxane, glycol monobromoacetic acid esters, glycerol monochloroacetates, bromoethyl isocyanate, chloromethyl naphthalene, 3-methyl-3-hydroxymethyl, oxetane-methane sulphonate, phenyl ethyl bromide, p-2-bromoethyl-benzoic acid, 5-chloromethylfuran-2-carboxylic acid, dichloroisopropyl ester of ethylphosphonic acid, bromoethyl ester of acetic acid, chloroacetamide, bromoacetamide, N-methyl-chloroacetamide, b-bromopropionic acid amide, a-chloropropionic acid amide, a-bromopropionic acid amide, a-bromoisobutyric acid amide, m-chloromethylbenzamide, p-chloromethylbenzamide, p-chloromethylbenzamide, 4-chloromethyl phthalic acid diamide, a-bromosuccinic acid diamide, 2-chloro-4,6-diamino-s-triazine, 2-chloro-4-methoxy-6-amino-s-triazine, a-methylsulphonylhydroxy succinic acid diamide, ethylsulphonylhydroxyacetamide, chloroacetyl urea, propane sultone, butane sultone, and epoxides are used in combination with water and/or a salt as quaternizing agent.

Polyfunctional alkylating agents are also suitable e.g., 1,4-dibromobutane, p-xylylene dichloride, 1,3-dimethyl-4,6-bis-chloromethylbenzene, methylene-bis-chloroacetamide, hexamethylene-bis-bromoethyl urethane, addition products of 2 to 3 mols of chloroacetamide with di- or tri-isocyanate.

Trimethylamine, triethylamine, triethanolamine, dimethylaminoethanol, N-methyl-diethanolamine, pyridine, quinoline and N-dimethylaminopropyl diethanolamine are mentioned as examples of tertiary amines which are suitable for quaternization.

8. Any acids may be used that are suitable for the salt formation of tertiary amines, such as hydrochloric acid, fluoboric acid, amidosulphonic acid, phosphoric acid and derivatives thereof, tartaric acid, oxalic acid, lactic acid, acetic acid, acrylic acid, sulphurous acid, sulphuric acid, hydrobromic acid, hydrofluoric acid, phosphorous acid and hypophosphorous acid.

9. Any bases may be used that are suitable for salt formation of carboxylic acids or of sulphonic acids including, for example, a. Organic bases such as monofunctional primary, secondary and tertiary amines, for example methylamine, diethylamine, ethylamine, tributylamine, pyridine, aniline, toluidine, alkoxylated amines such as ethanolamine, diethanolamine, triethanolamine, methyl diethanolamine, dimethylaminoethanol, oleyl diethanolamine and polyfunctional polyamines in which the individual amino groups may differ in their basicity, e.g., the polyamines obtained by hydrogenation of addition products of acrylonitrile with primary and secondary amines or peralkylated or partially alkylated polyamines such as N,N-dimethyl ethylene diamine, or compounds such as a-aminopyridine or N,N-dimethylhydrazine;

b. Inorganic bases or compounds which are basic in a reaction medium or which split off bases, such as ammonia, monovalent metal hydroxides, metal carbonates and metal oxides such as sodium hydroxide or potassium hydroxide.

The oligourethane salts of this invention are prepared in a known manner by reacting compounds which contain terminal hydroxyl groups and which have a molecular weight of between 400 and 5,000, preferably between 600 and 3,000 from group 1 with diisocyanates from group 2 and optionally with chain lengthening agents from groups 3 (a) to (f) at temperatures of between about 20° C and about 160° C (preferably between about 50° and about 120° C.). The chain lengthening agent may be added simultaneously or subsequently.

The following fundamental distinctions are made with respect to the structure of the oligourethanes which are to be used in the practice of this invention:

A. oligourethanes which contain terminal hydroxyl or primary resp. secondary amino groups and in which an NCO/OH ratio of 0.4 to 0.9 and preferably 0.5 to 0.8 is observed. The terminal hydroxyl or amino groups may then, if desired, be reacted with monofunctional isocyanates from group 4.

B. oligourethanes which contain terminal groups other than hydroxyl or primary resp. secondary amino groups. An NCO/OH ratio of between 1.1 and 2, preferably between 1.2 to 1.7 should be observed. In that case, there are generally at least two NCO groups per each oligourethane molecule, which corresponds to a free NCO group content of 0.3 to 20 percent by weight (preferably 0.8 to 10 percent by weight). This prepolymer is reacted with compounds of groups 5 and 6 which generally act as monofunctional chain breaking agents with respect to the isocyanate end groups. Therefore, the compounds mentioned in groups 5 and 6 should react mainly with chain breaking in order that the average molecular weight will not exceed 20,000 and will preferably be between 2000 and 10,000. The oligourethanes thus prepared do not contain contain terminal NCO-groups.

If the components from groups 3 and 5 are introduced in the synthesis of the oligourethanes in the form of salts, for example as methyl sulphate or, in the case of anionic components, in the form of the alkali metal or amine salts, the oligourethane salts are obtained directly after the completed synthesis reaction and are ready to use in the practice of the invention. If, on the other hand, the oligourethanes only contain potential salt groups at the stage of molecular synthesis, for example tertiary amino nitrogen or three carboxyl groups, then the oligourethanes are modified with salt-forming agents or quaternizing agents from groups 7, 8 or 9 after introduction of the end groups or at any time during the synthesis reaction. One may also use a combination of various salt-forming and/or quaternizing agents and the potential salt groups may be only partly neutralized or quaternized, if desired.

The oligourethane salts of this invention should have a salt group content of from about 10 to about 400 milliequivalents percent (i.e., from about 10 to about 400 milliequivalents per 100 g), and preferably from about 20 to about 200 milliequivalents percent. The observance of these limits insures good dispersability in water and a good emulsifying effect towards monomers.

The introduction of the chain breaking end groups into the oligourethanes synthesized as described under A or B is carried out at temperatures of between about 20° C and about 150° C. Temperatures of between about 60° and about 120° C. are preferred. At higher reaction temperatures there is a risk of incipient decomposition of the polyurethane mass, whereas at lower temperatures the reaction mass is difficult to stir. The reaction temperature chosen also depends on the reactivity of the compound added to the prepolymer to provide the end groups. In any event, it is advisable to operate above the melting point of the additive, which may be crystalline, in the event that the solubility is insufficient.

The oligourethanes of this invention may contain salt groups having diverse chemical constitutions. The following groups are examples of those most commonly used:

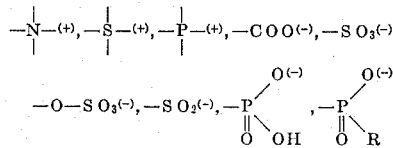

The oligourethanes need not be in the finished salt form before the water is added. Instead, these groups may be present as potential groups, i.e., in a form capable of salt formation. This is particularly advantageous if salt formation is effected by a simple neutralization process in the presence of water. The following groups are examples of those capable of salt formation:

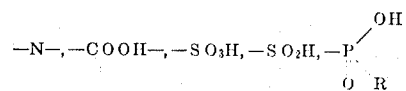

Since salt formation in an anhydrous medium is usually associated with a high increase in viscosity, it may be advantageous if salt formation by the addition of acids or bases is carried out only after the addition of water, particularly in the case of oligourethanes which are highly viscous in any case.

Salt groups and groups capable of salt formation may also be present simultaneously.

A point which should be considered in the preparation of the oligourethanes of this invention is that the solvent-free melt should be easy to handle in the usual mixing apparatus. Therefore, the oligourethane mass formed should preferably have a viscosity of less than about 1,500 poises and most preferably from about 50 to about 1,000 poises at about 120° C. Further, the viscosity may be lowered by the addition of small quantities of solvents such as dimethyl formamide, diethyl formamide, ethanol, isopropanol, methyl ethyl ketone, ethylene glycol, diethylene glycol and their ethers and esters, if desired. The quantity of solvent thus introduced should not exceed about 10 percent by weight of the total oligourethane dispersion; preferably, however, only from about 0.2 to about 5 percent by weight should be employed. Nevertheless, the oligourethanes of this invention are preferably prepared without the use of organic solvents. The viscosity of the oligourethane is, however, no essential feature of the process of the invention.

In the synthesis of cationic oligourethanes having built-in tertiary amino groups, it is generally possible to dispense with the use of a catalyst for the isocyanate reaction. When synthesizing sulphonium oligourethanes or oligourethanes which contain anionic groups, it is generally advantageous to use a catalyst. Any suitable catalysts may be used including particularly tertiary amines and organometallic compounds such as tributylamine diazabicyclooctane, pyridine, tin octoate, dibutyltin dilaurate, zinc octoate, cobalt naphthenate, iron acetyl acetonate and any of those suggested in U.S. Pat. Nos. 3,201,372; 2,948,928; 2,941,967; 2,948,691 and the like and mixtures thereof.

The oligourethanes of this invention can be adjusted to the required solids content by the addition of water in aqueous dispersions or salts (which may be optically clear). The oligourethanes should contain no free NCO groups and should have an average molecular weight of less than about 20,000 and preferably between about 2,000 and about 10,000. Although the average molecular weight is difficult to determine exactly, it can be assessed sufficiently accurately by end group determination and osmometric measurements. In many cases, the approximate average molecular weight is obtained from the stoichiometric relationships of the reactants in the synthesis of the polyurethane.

Cationic and anionic oligourethane salts suitable for use in the practice of this invention may also be prepared by the cationic or anionic modification of non-ionic oligourethanes via addition reactions. Thus, for example, oligourethanes which contain unsaturated C=C double bonds can be modified to form polyelectrolytes by the addition of any compound which contains at least one OH, SH, NHR or SCl group which is capable of undergoing an addition reaction and another group which is capable of salt formation, e.g.:

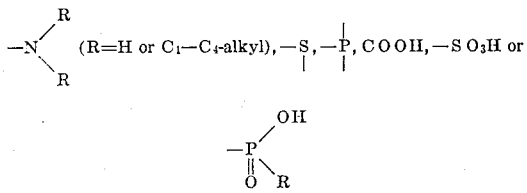

or a corresponding salt group.

Some examples of suitable compounds containing groups capable of addition reactions include thioglycollic acid, glycollic acid, b-chlorosulphenylpropionic acid, b-alanine-Na, lysine, dimethylaminoethanol, diethylaminoethylmercaptan, N,N-dimethylpropylene diamine, methyl-2-hydroxyethyl sulphide, ethyl-2-mercaptoethyl sulphide, taurine, N-methyltaurine, 2-mercaptoethyl sulphonic acid sodium, N,N-dimethylhydrazine, N,N-dimethylethylene diamine, sodium hydrogen sulphite and the like.

Another method of modification consists in reacting oligourethanes with cyclic compounds which have three to seven ring members and which contain salt-type groups or groups which are capable of salt formation after ring opening, e.g., dicarboxylic acid anhydrides, disulphonic acid anhydrides, sulphocarboxylic acid anhydrides, sultones, lactones, epoxycarboxylic acids, epoxysulphonic acids, N-carboxyglycine anhydride, carbyl sulphate and the like. This method of modification is described in detail in U.S. Pat. No. 3,461,103.

The polymerization reaction of the olefinically unsaturated monomers is carried out by the usual methods of emulsion polymerization in the presence of the oligourethanes described above. The ratio of polymerizable olefinically unsaturated monomers to oligourethane salts employed in this method is from about 5 to about 95 parts by weight, preferably 50 to 95 parts by weight, of polymerizable monomers to from about 95 to about 5 parts by weight, preferably 5 to 50 parts by weight of oligourethane. Another advantageous range is from about 5 to about 15 parts by weight of monomer to from about 85 to about 95 parts by weight of oligourethane.

Any suitable olefinically unsaturated monomers may be polymerized in the practice of this invention including:

a. a,b-Olefinically unsaturated monocarboxylic acids containing 3 to 5 carbon atoms and their derivatives such as acrylic, methacrylic and crotonic acid, acrylic and methacrylic acid amides, acrylonitrile and methacrylonitrile, esters of acrylic and methacrylic acid, particularly those with saturated monohydric aliphatic or cycloaliphatic alcohols which contain one to 20 carbon atoms, such as esters of the above mentioned acids with methyl, ethyl, propyl, isopropyl, isobutyl, hexyl, octyl or stearyl alcohol, cyclohexanol, methylcyclohexanol or with benzyl alcohol, phenol, cresol or furfuryl alcohol; monoesters of a,b-monoolefinically unsaturated monocarboxylic acids having three to four carbon atoms with divalent saturated aliphatic alcohols having two to four carbon atoms, for example 2-hydroxyethyl methacrylate, 2-hydroxypropyl methacrylate, 4-hydroxybutyl methacrylate, 2-hydroxyethyl acrylate, 2-hydroxypropyl acrylate and 4-hydroxybutyl acrylate; aminoalkyl esters of acrylic and methacrylic acid, such as 2-aminoethyl (meth)acrylate hydrochloride, glycol diacrylate, glycol dimethacrylate, alkyl esters of acrylic or methacrylic acid, and glycerol trisacrylic esters of glycerol trismethacrylic esters.

b. a,b-Olefinically unsaturated dicarboxylic acids containing three to five carbon atoms and their derivatives, such as fumaric acid, maleic acid, itaconic acid, mono- and di-esters of the above mentioned dicarboxylic acids having one to 18 carbon atoms in the alcohol radical such as dimethyl maleate, diethyl maleate, dibutyl maleate, monohexyl maleate and monocyclohexyl maleate.

c. Mono- and di-esters of vinyl alcohol with carboxylic acids or with hydrohalic acids, vinyl ethers, vinyl ketones, vinyl amides, such as vinyl acetate, vinyl propionate, vinyl laurate, vinyl stearate, vinyl benzoate, chlorovinyl acetate, divinyl adipate, vinyl chloride, vinylidene chloride, vinyl ethyl ether, vinyl butyl ether, or vinyl isobutyl ether, vinyl ether ketone, vinyl formamide, N-vinyl acetamide and the like.

d. Vinyl compounds of aromatic compounds and heterocyclic compounds, such as styrene, a-methylstyrene, vinyltoluene, p-chlorostyrene, divinylbenzene, 2-vinyl pyrrolidone and 2-vinyl pyridine.

e. N-Methylol ethers of acrylic acid amide and methacrylic acid amide having the formula:

(I) 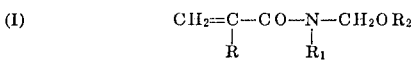

in which
R is hydrogen or a methyl group,
$R_1$ is hydrogen or an $C_1$–$C_4$-alkyl, $C_7$–$C_{10}$-aralkyl or $C_6$–$C_{10}$-aryl group,
$R_2$ is an $C_1$–$C_6$-alkyl or cycloalkyl group such as methyl, ethyl, n-propyl, isopropyl, n-butyl, isobutyl or cyclohexyl groups (see U.S. Pat. No. 2,978,432);
and unetherified N-methyl compounds of acrylic and methacrylic acid amide.

f. Mannich bases of acrylic acid amide and of methacrylic acid amide having the formula:

(II) 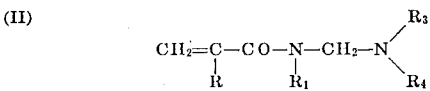

in which
R and $R_1$ are as described for formula I, and
$R_3$ and $R_4$ are $C_1$–$C_6$-alkyl or cycloalkyl groups or together represent a heterocyclic radical such as the morpholine radical. Suitable compounds of this type are mentioned in U.S. Pat. application Ser. No. 851,971, filed on Nov. 10, 1959.

g. Acrylic and methacrylic acid derivatives which contain a terminal halomethyl carbonyl group and have the formula (III)
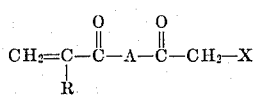

in which
R is hydrogen or $CH_3$,
A is $-NH-CH_2-NH-$, $-NH-CO-NH-$

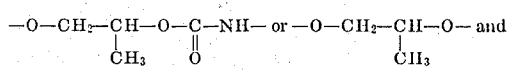

X is Cl or Br
(see U.S. Pat. No. 3,467,614).

h. Alkyl compounds such as trisacryloyl-perhydro-s-triazine, triallyl cyanurate, triallyl phosphate or allyl alcohol.

i. Monoolefinically unsaturated aliphatic hydrocarbons having two to six carbon atoms such as ethylene, propylene, hexylene, butylene, isobutylene and the like.

j. Conjugated diolefines having four to six carbon atoms, such as butadiene, isoprene, 2,3-dimethyl butadiene, chlorobutadiene and the like.

k. Norbornene and hydroxymethyl norbornene.

Acrylic and methacrylic acid esters having one to 12 carbon atoms in the alcohol residue, acrylonitrile, styrene, acrylic and methacrylic acid nitrile, vinyl acetate, vinyl propionate, vinyl chloride, vinylidene chloride or ethylene or propylene in combination with one or more of the monomers mentioned above are particularly advantageous.

The polymerization reaction is carried out at temperatures of from about 0° to about 140° C. and preferably from about 40° to about 130° C.

Any suitable polymerization initiators which decompose into radicals may be used in quantities of from about 0.05 to about 3 percent by weight based on the weight of the mono- or di-olefins. Some suitable initiators include peroxides such as, for example, lauroyl peroxide, cyclohexanone hydroperoxide, tertiary butyl peroctoate, tertiary butyl perpivalate, dichlorobenzoyl peroxide, benzoyl peroxide, di-tertiary butyl peroxide, tertiary butyl hydroperoxide and cumene hydroperoxide; peroxy carbonates such as diisopropyl peroxydicarbonate, dicyclohexyl peroxydicarbonate and diisooctylperoxydicarbonate; sulphonyl peroxides such as acetyl cyclohexyl sulphonyl peracetate, sulphonyl hydrazides and azo compounds such as azodiisobutyric acid dinitrile. Inorganic peroxides such as hydrogen peroxide, potassium peroxydisulphate and ammonium peroxydisulphate are also suitable.

The initiators which decompose into radicals may be used alone or in combination with reducing agents or heavy metal compounds. Sodium pyrosulphite, potassium pyrosulphite, formic acid, ascorbic acid, hydrazine derivatives, amine derivatives and Rongalite are examples of such compounds. The heavy metal compounds may be present either in an oil-soluble or in a water-soluble form. Water-soluble heavy metal compounds include, for example, silver nitrate, halides or sulphates of divalent or trivalent iron, cobalt or nickel or salts of titanium or vanadium of lower valency state. Examples of oil-soluble heavy metal compounds are cobalt naphthenate and the acetylacetone complexes of vanadium, cobalt, titanium, nickel or iron.

The polymerization is preferably carried out at pH values of from about 2 to about 9.

The process of the invention is carried out under radical emulsion polymerization conditions, this means in aqueous medium in the presence of an oligourethane salt as emulsifier for the starting materials as well as for the end products and of radical initiating catalysts at temperatures such that the catalyst becomes active.

Polymerization is carried out in an aqueous emulsion. According to a preferred method the olefinic monomers are mixed with the oligourethanes described above and then emulsified by stirring water into the mixture. The oligourethanes act as emulsifiers so that ordinary, low speed stirrers may be used.

In another advantageous method for carrying out the polymerization reaction the monomers are added to an aqueous sol of oligourethanes, and again stable emulsions can be obtained using conventional low speed stirrers. The solids content of the aqueous oligourethane dispersions used should be from about 2 to about 55 percent by weight. A solids content of from about 10 to about 30 percent by weight is especially advantageous.

In still another embodiment 10 – 25 percent of the total monomers are emulsified in an aqueous sol of the oligourethane and the remainder of the monomers is added after polymerization has been initiated.

In yet another embodiment, an emulsion of monomers in an aqueous sol of oligourethane salts may be added gradually to a monomer emulsion or to a nuclear latex. Although the polymerization initiators may be added at any time, the operation is preferably carried out in such a way that polymerization starts only after the aqueous emulsion has been formed in order to prevent an unwanted increase in viscosity in the homogeneous organic phase. While polymerization is complete in from about 1 to about 20 hours, in most cases 2 to 6 hours is sufficient.

After the reaction is complete, residual monomers or water or small quantities of added solvents may be removed, for example by distillation. Furthermore, the dispersions of this invention may be creamed up, for example, by using additives such as alginates.

Stable dispersions having a solids content of from about 20 percent to about 60 percent by weight may be obtained by the process of this invention.

The dispersions may be blended with dispersions of like charge, e.g., with polyvinyl acetate dispersions or dispersions of polyethylene, polystyrene, polybutadiene, polyvinyl chloride and polymer resins. Further, fillers, plasticizers, pigments, hydrofluoric acid and silicic acid sols and dispersions of aluminum, clay, asbestos and the like may be incorporated therein.

The dispersions of the modified vinyl polymers of this invention in water are stable and suitable for storage and transport and can be molded or otherwise shaped at any subsequent time. The dispersions generally dry directly to form dimensionally stable synthetic resin coatings. Shaping of the products may also be carried out in the presence of known cross-linking agents. For this purpose, polyfunctional cross-linking substances can be added to the modified vinyl polymers at any time during the process of this invention as well as after the evaporation of any solvent present either at room temperature or elevated temperature. Some examples of such cross-linking agents include sulphur, sulphur sols, free and partially or completely masked polyisocyanates, carbodiimides, formaldehyde or substances which give off formaldehyde, methylol compounds and their ethers and organic and inorganic peroxides. The cross-linking agents which may be in the form of solutions or suspensions, fillers, pigments, blending agents and other additives may be added in the course of the process. The dispersions of the invention remain stable even after addition of the cross-linking agent. Films prepared from the dispersions containing cross-linking agents are, however, completely water-resistant.

The aqueous dispersions of this invention may have a liquid or pasty consistency and are stable without the addition of an emulsifier. However, suitable cationic, anionic or neutral emulsifiers and protective colloids as well as thickeners such as casein which has been decomposed by acid or ammoniacal decomposition, soaps, invert soaps, alkyl sulphonates, polyvinyl alcohol, ethoxylated phenols, oleyl alcohol polyglycol ethers, ethoxylated polypropylene glycol or natural products such as gelatin, gum arabic, tragacanth or fish glue may be added in the course of the process. Such additives serve mainly to reduce the comparatively high surface tension of the dispersions although they also advantageously affect the chemical stability of the dispersions and their coagulability. Nevertheless, the addition of emulsifiers customarily used in emulsion polymerization is by no means necessary in the process of the invention.

The aqueous salts or dispersions obtained by the process of this invention are versatile in their use. Thus, dip molded articles can be prepared or foam resins may be obtained by the latex churning process. Coagulates can also be obtained by the addition of an electrolyte to the aqueous solutions and dispersions which can be worked up on mixing rollers. By evaporating the water, non-sticky and sticky films and foils can be obtained. The products of this invention are suitable for coating, covering and impregnating woven and non-woven textiles, leather, paper, wood, metal, ceramic, stone, concrete, bitumen, hard fiber, straw, glass, porcelain, synthetic resins of all kinds and glass fibers. They may be employed as antistatic and crease-resistant finishes and as binders for fleeces, as adhesives, adhesifying agents, laminating agents, agents for rendering substances hydrophobic, plasticizers or binders, e.g., for cork powder, sawdust, glass fibers, asbestos, paper-type materials, plastics, rubber waste or ceramic materials, or as auxiliary agents in cloth printing as well as in the paper industry, as additives for polymer dispersions and as sizes and as a finishing agent for leather.

The invention is further illustrated but is not intended to be limited by the following examples in which all parts and percentages are by weight unless otherwise specified.

EXAMPLES

Starting materials

Oligourethane 1:
 About 580 parts (0.333 mol) of a polyester of adipic acid, hexane-1,6-diol and 2,3-dimethylpropane-1,3-diol (HN), molar ratio 30:22:12
 About 79 parts (0.667 mol) of N-methyl-diethanolamine (MDE)
 About 236 parts (1.400 mol) of hexane-1,6-diisocyanate
 About 93 parts (0.800 mol) of 3-ethyl-3-hydroxymethyl-oxetane
 About 58 parts of 85 per cent phosphoric acid
 About 2,200 parts of water HN, MDE and 100 ml of glycol monomethyl ether acetate are heated to about 70° C. The diisocyanate is added dropwise in about 5 minutes and after the exothermic reaction the temperature is maintained at about 130° to 135° C. for 20 minutes. The reaction mixture is then cooled to about 95° C. and the oxetane is added followed 10 minutes later by the addition of the phosphoric acid in about 200 parts of water and then about 2,000 parts of water are added. The reaction mixture is then stirred for one hour at about 80° C. and cooled to room temperature.

An opaque sol which has a solids content of about 32 percent is obtained. pH = 5, particle size = 1. The molecular weight of the oligourethane salt is approximately 2,500.

An air-dried foil prepared from the opaque sol treated at about 120° C. for about 20 minutes has a tensile strength of less than 1 kg wt/cm$^2$. It is clear, waxy and sticky.

Oligourethane 2:
 About 580 parts (0.333 mol) of a polyester of adipic acid, hexane-1,6-diol and 2,2-dimethylpropane-1,3-diol (HN), molar ratio 30:22:12
 About 80.5 parts (0.500 mol) of 2-dimethylamino-2-ethylpropane-1,3-diol (DTPE)
 About 196 parts (1.170 mol) of hexane-1,6-diisocyanate
 About 78 parts (0.670 mol) of 3-ethyl-3-hydroxymethyl-oxetane
 About 37 parts of 85 per cent phosphoric acid
 About 2,200 parts of water.

The method is analogous to that employed for oligourethane 1. An opaque sol which has a solids content of about 27.8 per cent is obtained. pH = 5, particle size = 1. The molecular weight of the oligourethane salt is approximately 2,800.

A clear foil prepared from the opaque sol which has been afterheated at about 120° C. for about 20 minutes is waxy and sticky. It has a tensile strength of less than 1 kg wt/cm$^2$.

Oligourethane 3:
 About 500 parts (0.295 mol) of a polyester of adipic acid, hexane-1,6-diol and 2,2-dimethylpropane-1,3-diol (HN), molar ratio 30:22:12
 About 41 parts (0.254 mol) of 2-dimethylamino-2-ethylpropane-1,3-diol (DTPE)
 About 33 parts (0.555 mol) of urea
 About 140 parts (0.830 mol) of hexane-1,6-diisocyanate
 About 18 parts of 85 per cent phosphoric acid
 About 1,100 parts of water.

HN, DTPE and urea are heated to about 75° C. The isocyanate is added dropwise in about 2 minutes and the reaction mixture is heated to about 135° C. The temperature is maintained at about 135° C. for about 30 minutes. About 100 ml of glycol monomethyl ether acetate are added to reduce the viscosity and the reaction mixture is cooled to about 110° C. The phosphoric acid is added in about 200 parts of water and a further about 900 parts of water are added dropwise at about 75° C. within about 1 hour.

An opaque sol which has a solids content of about 40.4 percent is obtained. pH = 4.5, particle size = 1. Molecular weight approximately 2,600. A foil produced as described for oligourethane 1 is clear and sticky and has a tensile strength of less than about 2 kg wt/cm$^2$.

Oligourethane 4:
   About 475 parts (0.500 mol) of propoxylated 2-dimethylaminomethyl-2-ethyl propane-1,3-diol, m. w. 950 (PE)
   About 118 parts (0.700 mol) of hexane-1,6-diisocyanate
   About 27 parts (0.450 mol) of urea
   About 38 parts of 85 percent phosphoric acid
   About 45 ml of 30 percent formalin
   About 1,400 parts of water.

PE and urea are heated to about 75° C. and the isocyanate is added dropwise in about 2 minutes. The temperature is raised to about 135° C. and maintained at this level for about 1 hour. The viscosity is reduced with about 30 ml of glycol monomethyl ether acetate and the reaction mixture is cooled to about 110° C. The phosphoric acid is added in about 200 parts of water followed by the addition of a further about 500 parts of water. The formalin and the remainder of the water are then added dropwise at about 90° C. and the reaction mixture is cooled to room temperature.

An opaque sol is obtained. pH = 5, particle size = 2, solids content = 31 per cent, molecular weight of the oligourethane = approximately 6,000. The sol dries to form a clear, self-supporting foil which has a tensile strength of less than 20 kg wt/cm$^2$.

Oligourethane 5:
The composition and method of preparation are as described for oligourethane 4 except that only about 34 parts of 85 percent phosphoric acid are used.

An opaque sol is obtained. pH = 5, particle size = 2, solids content = 31.5 percent. The sol dries to form a self-supporting, clear foil which has a tensile strength of less than 10 kg wt/cm$^2$.

Oligourethane 6:
   About 237 parts (0.10 mol) of a polyester of adipic acid and diethylene glycol, molar ratio 1:1.2
   About 34 parts (0.20 mol) of hexane-1,6-diisocyanate
   About 144 parts (0.20 mol) of sodium taurinate as a 20 percent solution in water
   About 14 parts (0.25 mol) of potassium hydroxide
   About 32 parts (0.20 mol) of maleic acid ureide
   About 950 parts of water The diisocyanate is added to the polyester at about 80° C. and the reaction mixture is heated to about 120° to about 125° C. and maintained at this temperature for about 2 hours after which it is cooled to about 90° C. The solution of sodium taurinate, potassium hydroxide and maleic acid ureide are added all at once. After about 15 minutes the water heated to about 90° C. is added dropwise at this temperature in the course of from about 20 to about 50 minutes. An opaque sol which has a solids content of about 2.56 per cent is obtained. pH = 8, particle size = 1. An air-dried, self-supporting foil prepared from the opaque sol is clear and non-sticky and has a tensile strength of less than 1 kg wt/cm$^2$. The molecular weight of the oligourethane salt is approximately 5,000.

Oligourethane 7:
   About 356 parts (0.15 mol) of a polyester of adipic acid and diethylene glycol, molar ratio 1:1.2
   About 42 parts (0.25 mol) of hexane-1,6-diisocyanate
   About 144 parts (0.20 mol) of sodium taurinate as a 20 percent solution in water
   About 14 parts (0.25 mol) of potassium hydroxide
   About 32 parts (0.20 mol) of maleic acid ureide
   About 600 parts of water.

A white dispersion having a solids content of 37.2 per cent is obtained by the reaction carried out as described for oligourethane 6 pH = 1.5, particle size = 2 to 3. A clear, non-sticky foil having a tensile strength of less than 5 kg wt/cm$^2$ is obtained from the dispersion. The molecular weight of the oligourethane salt is approximately 7,000.

Oligourethane 8:
An oligourethane analogous to oligourethane 4 is obtained from:
   About 260 parts (0.125 mol) of propoxylated 2-dimethylaminomethyl-2-ethylpropane-1,3-diol, m. w. 2,080
   About 29 parts (0.175 mol) of hexane-1,6-diisocyanate
   About 7 parts (0.116 mol) of urea
   About 10 parts of 85 per cent phosphoric acid and
   About 900 parts of water In the form of an optically clear sol; pH = 4.5, solids content = 25.3 percent. The molecular weight of the oligourethane is approximately 5,000. The sol dries to form a clear, sticky foil which has a tensile strength of less than 5 kg wt/cm$^2$.

Oligourethane 9:
An optically clear sol, pH = 5, solids content = 25 percent, molecular weight approximately 5,000, is obtained in a manner analogous to oligourethane 4 from:
   About 260 parts (0.125 mol) of propoxylated 2-dimethylaminomethyl-2-ethylpropane-1,3-diol, m. w. 2,080,
   About 31.5 parts (0.175 mol) of 1-methyl-2,4-diisocyanato-cyclohexane (isomeric mixture 80:20),
   About 7 parts of urea,
   About 10 parts of 85 per cent phosphoric acid and
   About 900 parts of water.

The properties of the foil are similar to those of oligourethane 8.

Oligourethane 10:
An optically clear sol, pH = 4.5, solids content = 25.6 percent, molecular weight approximately 5,000, is obtained in a manner analogous to oligourethane 4 from:
   About 260 parts (0.125 mol) of propoxylated 2-dimethylaminomethyl-2-ethylpropane-1,3-diol, m. w. 2,080,
   About 39 parts (0.175 mol) of isophorone diisocyanate, About 7 parts of urea,
About 10 parts of 85 percent phosphoric acid and
About 900 parts of water.

The properties of the foil are similar to those of oligourethane 8.

Oligourethane 11:

An optically clear sol, pH = 5, solids content = 23.5 per cent, molecular weight approximately 5,000, is obtained in a manner analogous to oligourethane 10 but using about 30.4 parts (0.175 mol) of tolylene diisocyanate (isomeric mixture 65:35). The properties of the foil are similar to those of oligourethane 8.

Oligourethane 12:

An optically clear sol, pH = 4, solids content = 19.6 percent, molecular weight approximately 5,000, is obtained in a manner analogous to oligourethane 10 from about 245 parts (0.250 mol) of propoxylated 2-dimethylaminomethyl-2-ethylpropane-1,3-diol, m. w. 980, about 59 parts (0.350 mol) of hexane-1,6-diisocyanate, about 13.5 parts of urea, about 38 parts of 85 percent phosphoric acid, about 45 parts of 30 percent formalin and about 1,400 parts of water. An air-dried film prepared from the sol and heated to about 130° C. for about 20 minutes is clear and non-sticky but has a tensile strength of less than 20 kg/cm².

Oligourethane 13:

If about 25 parts of 85 percent phosphoric acid and only about 700 parts of water are used in the method described for oligourethane 12, an optically clear sol having a pH = 5, solids content = 32.8 percent and molecular weight = approximately 5,000 is obtained. The properties of the film are similar to those of oligourethane 12.

Oligourethane 14:

About 490 parts (0.500 mol) of propoxylated methyl diisopropanolamine, m. w. 980,
About 118 parts (0.700 mol) of hexane-1,6-diisocyanate,
About 27 parts of urea,
About 50 parts of 85 per cent phosphoric acid,
About 90 parts of 30 percent formalin and
About 1,400 parts of water.

By a method analogous to that employed for oligourethane 4, an optically clear sol, pH = 5, solids content = 35.8 per cent, molecular weight =approximately 5,000 is obtained. The properties of the film are similar to those of oligourethane 12.

EXAMPLE 1

About 50 parts of water are added to about 470 parts of the sol of oligourethane 1 with stirring and about 150 parts of vinyl acetate are then added dropwise. The apparatus is then carefully washed with pure nitrogen and heated to about 65° C. under a stream of nitrogen. Using two dropping funnels, about 40 parts of about a 3 percent aqueous potassium peroxydisulphate solution and about 40 parts of about a 0.3 percent aqueous sodium pyrosulphite solution as catalyst solutions are simultaneously added dropwise in the course of about one hour. Polymerization starts immediately; the temperature rises to from about 70° to about 75° C. After the addition of these two substances, the temperature is maintained at about 65° C. for a further 4 hours and the reaction mixture is then cooled to room temperature.

Yield: 745 g.
Properties of the dispersion:
pH = 5
particle size = 2
solids content = 40 per cent
viscosity Ford-Becher/D 4: 16.8".
Properties of film:
Clear, relatively elastic film of high tensile strength.

EXAMPLES 2 TO 18

The procedure is the same as that in Example 1. The data are shown in Table 1.

The yields of dispersions are between 80 and 99 percent of the theoretical yields.

EXAMPLE 19

About 100 parts of 20 percent oligourethane 6 and 20 parts of ethyl acrylate are mixed in a mineral water bottle. The bottle is carefully washed with pure nitrogen, closed with a serum cap and perforated crown cork, and about 6 parts of each of the catalyst solutions mentioned in Example 1 are injected. The contents of the bottle are thoroughly shaken, a slight excess pressure of nitrogen is produced, and the bottle is kept in a roller box at about 60° C for about 5 hours. The cooled dispersion has the following properties:

pH = 8
particle size = 1
solids content = 30.1 per cent
viscosity Ford-Becher/D 4: 10.4"
Yield: approximately 130 g
Properties of film:
Clear, soft film with good tensile strength and pleasant hand.

EXAMPLES 20 to 23

The method is the same as that of Example 19. The corresponding data are found in Table 1. The yields of dispersion are 80 to 99 percent of the theoretical.

EXAMPLES 24 TO 28

The procedure is the same as that of Example 1. The corresponding data for the dispersions will be found in Table 1.

TABLE 1

| Example | Oligo-urethane | Solids content (percent) | Quantity of sol used (g.) | Water (g.) | Catalyst K$_2$S$_2$O$_8$, 3% aqueous solution | Catalyst Na$_2$S$_2$O$_5$, 3% aqueous solution | Monomer | Quantity (g.) | Particle size of D. | pH of the dispersion | Solids content (percent) | Viscosity Ford-Becher nozzle 4 (sec.) |
|---|---|---|---|---|---|---|---|---|---|---|---|---|
| 2 | 1 | 32.0 | 470 | 270 | 40 | 40 | VA | 300 | 1-2 | 5 | 39.4 | 14.7 |
| 3 | 1 | 32.0 | 470 | 160 | 40 | 40 | EA | 150 | 1 | 5 | 35.4 | 13.4 |
| 4 | 1 | 32.0 | 470 | 160 | 40 | 40 | VA | 100 | 1 | 5 | 33.9 | 12.8 |
| 5 | 1 | 32.0 | 470 | 160 | 40 | 40 | EA+ST(1:1) | 150 | 1-2 | 5 | 35.0 | 13.0 |
| 6 | 2 | 27.8 | 550 | 350 | 40 | 40 | VA | 150 | 1 | 5 | 26.7 | 11.5 |
| 7 | 2 | 27.8 | 550 | 350 | 40 | 40 | VA | 300 | 1-2 | 5 | 33.9 | 13.0 |
| 8 | 3 | 40.4 | 400 | 500 | 50 | 50 | EA | 150 | 1-2 | 5 | 26.0 | 11.0 |
| 9 | 3 | 40.4 | 400 | 500 | 50 | 50 | VA | 150 | 1-2 | 4.5 | 25.3 | 11.0 |
| 10 | 4 | 31.0 | 400 | 400 | 50 | 50 | VA | 130 | 1 | 5 | 28.9 | 12.8 |

Table 1—Continued

| Example | Oligo-urethane | Solids content (percent) | Quantity of sol used (g.) | Water (g.) | Catalyst K₂S₂O₈, 3% aqueous solution | Catalyst Na₂S₂O₅, 3% aqueous solution | Monomer | Quantity (g.) | Particle size of D. | pH of the dispersion | Solids content (percent) | Viscosity Ford-Becher nozzle 4 (sec.) |
|---|---|---|---|---|---|---|---|---|---|---|---|---|
| 11 | 4 | 31.0 | 350 | 350 | 50 | 50 | VA | 525 | 4 | 5 | 42.3 | 21.0 |
| 12 | 4 | 31.0 | 350 | 350 | 50 | 50 | VA | 210 | 3-4 | 5 | 30.3 | 12.5 |
| 13 | 5 | 31.5 | 500 | 500 | 50 | 50 | EA | 150 | 2 | 5 | 25.0 | 12.0 |
| 14 | 5 | 31.5 | 500 | 500 | 50 | 50 | EA | 150 | 2 | 5 | 24.2 | 11.3 |
| 15 | 5 | 31.5 | 400 | 400 | 50 | 50 | ST | 128 | 2 | 5 | 25.0 | 11.6 |
| 16 | 6 | 35.2 | 425 | 245 | 40 | 40 | ST | 150 | 1-2 | 7 | 33.6 | 11.2 |
| 17 | 6 | 25.6 | 520 | 150 | 40 | 40 | ST+BA(1:1) | 150 | 2 | 7.5 | 31.2 | 13.0 |
| 18 | 6 | 25.6 | 520 | 150 | 40 | 40 | BA | 150 | 2 | 7.5 | 31.4 | 12.2 |
| 20 | 6 | 20.0 | 100 | | 6 | 6 | BA | 20 | 1 | 7.5 | 31.9 | 10.4 |
| 21 | 6 | 20.0 | 100 | | 6 | 6 | ST | 20 | 1-2 | 7.5 | 32.0 | 11.3 |
| 22 | 6 | 20.0 | 100 | | 6 | 6 | VA | 20 | 2 | 4.5 | 26.9 | 17.5 |
| 23 | 6 | 20.0 | 100 | | 6 | 6 | EA | 20 | 1 | 7.5 | 32.0 | 11.3 |
| 24 | 8 | 25.3 | 200 | 100 | 25 | 25 | VA | 50 | 2 | 4 | 22.3 | 11.5 |
| 25 | 9 | 25.0 | 200 | 200 | 10 | 10 | VA | 10 | 1 | 4.5 | 18.6 | 11.6 |
| 26 | 10 | 25.6 | 200 | 200 | 10 | 10 | VA | 50 | 1 | 4.5 | 19.9 | 12.8 |
| 27 * | 11 | 23.5 | 200 | 400 | | | VA | 200 | 2 | 4.5 | 30.1 | 12.2 |
| 28 | 12 | 19.5 | 200 | 100 | 25 | 25 | VA | 50 | 1 | 3 | 21.0 | 11.7 |

VA=vinyl acetate; EA=ethyl acrylate; ST=styrene; BA=butyl acrylate.
(a) Particle size, qualitative: 1 opaque and transparent, approximately 50 mμ φ; 2 to 5 particle size between a and 6; 6 milky white dispersion approximately 1 μ φ.
* Polymerization was released by the addition of 2 g. of azodiisobutyric acid nitrile.

TABLE 2

Properties of film
Example
1 clear, relatively hard films of low elasticity and high tensile strength
2 relatively hard, clear film of high tensile strength
3 soft, clear, highly elastic film 4 soft, elastic film of relatively low tensile strength
5 opaque, hard and brittle film
6 clear and soft film, low tensile strength
7 clear film of high tensile strength
8 clear, soft film
9 clear, soft film of moderate tensile strength
10 clear, elastic and soft film of high tensile strength
11 clear, elastic and soft film of high tensile strength
12 clear, relatively hard film of excellent tensile strength
13 clear, elastic and soft film
14 clear, elastic and soft film
15 opaque, inelastic, relatively hard film
16 opaque, brittle and hard film
17 opaque film of relatively low tensile strength
18 clear, soft and elastic film
19 clear, soft film of good tensile strength
20 clear, soft film
21 opaque, relatively hard and brittle film
22 clear, soft film
23 clear, soft film with relatively good tensile strength
24–28 clear, non-sticky films with good tensile strength

EXAMPLE 29

About 500 parts of oligourethane 2 are introduced under nitrogen into a flask equipped with stirrer, and a solution of about 1.3 parts of potassium persulphate in about 300 parts of desalted water is stirred in. About 150 parts of vinylidene chloride are then dispersed in the contents of the flask, the reaction mixture is heated to the reflux temperature and polymerization is initiated by the dropwise addition of about 0.3 part of sodium pyrosulphite in about 100 parts of water. The temperature is then kept at about 60 C. for about 5 hours.

Yield: 1040 g Properties of dispersion:
Solids content 25.4 percent, pH 5, particle size 1.

Properties of film:
The dispersion dries to form a clear, non-sticky but brittle film.

EXAMPLE 30

About 500 parts of oligourethane sol 2 are introduced into an autoclave and a solution of about 375 parts of water and about 1 part of potassium persulphate is stirred in. After the air has been displaced with nitrogen, about 26 parts of vinyl chloride and about 149 parts of vinylidene chloride are forced in. The reaction mixture is then heated at about 50°C. for about 5 hours and thereafter at about 60°C. for about 5 hours. The dispersion has a solids content of about 28.5 percent and on drying yields a clear, elastic film.

EXAMPLE 31

Using the method described in Example 30, about 500 parts of water and about 3 parts of potassium persulphate are added to about 1,000 parts of oligourethane 2 and dispersed together with about 270 parts of vinyl chloride in a pressure vessel under nitrogen. The reaction mixture is heated to about 55°C. and polymerized at that temperature for about 10 hours. The autoclave content is homogeneous. The dispersion dries to form a clear film which has a chlorine content of 25.3 per cent, corresponding to a polyvinyl chloride content of 45 percent.

EXAMPLE 32

The previous example is repeated except that the reaction mixture is saturated with 30 atmospheres of ethylene at room temperature. The stable dispersion yields a clear, elastic film when dried in air at room temperature.

EXAMPLE 33

Example 31 is repeated using about 270 parts of butadiene instead of vinyl chloride. A stable dispersion which dries in air to form a clear film is obtained.

EXAMPLE 34

About 500 parts of aqueous oligourethane 2 are diluted with about 175 parts of water under nitrogen in a vessel equipped with a stirrer and about 100 parts of a mixture of about 50 parts of styrene, about 5 parts of acrylic acid, about 10 parts of oxypropyl methacrylate, about 10 parts of acrylamide-N-methylol methyl ether and about 25 pats of butyl acrylate are dispersed therein. The reaction mixture is polymerized under nitrogen at about 60°C. by dropwise addition of a solution of about 0.5 percent (based on the monomer mixture) of potassium peroxydisulphate in about 50 parts of water and about 0.05 percent of sodium pyrosulphite in about 50 parts of water in the course of about 6 hours. When dry, the dispersion (solids content 29 percent) yields a clear film which, after being heated to about 180°C. (30 minutes), is insoluble in the usual solvents.

EXAMPLE 35

About 113 parts of hexane-1,6-diisocyanate are added at about 83°C. to about 500 parts of a polyester of adipic acid, hexanediol and neopentyl glycol (molar ratio 30:22:12, molecular weight 1740) and about 36 parts of N-butyldiethanolamine. The temperature rises to about 136°C. within about 6 minutes. After about 30 minutes' stirring at about 131° to about 144°C., about 19 parts of urea are added. The molecular weight of the oligourethane before polymerization is approximately 5,000. After a further about 30 minutes' stirring at about 130° to about 140°C, the following are added successively: a solution of about 18 parts of 85 percent phosphoric acid in about 100 parts of water at about 95°C in the course of about 9 minutes, about 70 parts of butyl acrylate in the course of about 4 minutes and about 1,000 parts of water at about 90°C. in the course of about 30 minutes. Polymerization is then initiated by simultaneously adding about 20 parts of a 3 percent potassium persulphate solution and about 20 parts of a 0.3 percent sodium pyrosulphite solution dropwise to the resulting dispersion at about 80°C. The reaction mixture is then stirred for about 2 hours at about 80°C., and about 100 parts of a 30 percent aqueous formaldehyde solution are added.

A white, coarse latex is obtained which has a solids content of 35 percent.

Drying at room temperature and after-heating at about 120°C. yields a soft, transparent and elastic foil which has very good resistance to hydrolysis.

EXAMPLE 36

About 474 parts of a polyester of adipic acid and diethylene glycol (molar ratio 1:1.2; molecular weight 2,300) and about 67 parts of hexamethylene-1,6-diisocyanate are stirred for about 2 hours at about 117° to about 129°C. About 70 parts of methyl acrylate and a solution of about 288 parts of a 20 percent sodium taurinate solution, about 28 parts of potassium hydroxide and about 64 parts of maleic acid monoureide in about 100 parts of water which has been prepared about 20 minutes previously are added successively to the melt which has been cooled to about 81°C. About 20 minutes later, the following are added successively: about 1 part of benzoyl peroxide in about 5 cc of acetone, about 1,500 cc of water at about 70°C. and about 0.1 part of dimethyl aniline in about 2 cc of acetone (polymerization starter). Polymerization is finished after about 3 hours' stirring at about 70°C. About 100 parts of 30 percent formalin and about 200 parts of 20 percent phosphoric acid are added to the resulting dispersion. An opaque, highly fluid sol is obtained which has a solids content of 32 percent.

EXAMPLE 37

The procedure is the same as in Example 36 but about 70 parts of acrylonitrile are added instead of methyl acrylate. An opaque, highly fluid sol is obtained which has a solids content of 32 percent.

EXAMPLE 38

About 500 parts of polypropylene ether glycol of molecular weight 2,000 and about 133 parts of tolylene diisocyanate (isomeric mixture 65:35) are stirred for about 30 minutes at about 80° to about 90°C. About 21 parts of urea are then added, the reaction mixture is heated to about 135°C. in the course of about 17 minutes and then cooled to about 70°C. in the course of about 30 minutes. About 40 parts of N-methyldiethanolamine are added, the reaction mixture is stirred for about one hour at about 70°C. and the following are then added successively: about 100 parts of vinyl acetate, a solution of about 30 parts of 85 percent phosphoric acid in about 100 parts of water, about 1 part of benzoyl peroxide in about 9 parts of acetone, about 1,900 parts of water (70°C) and about 0.1 part of dimethyl aniline in about 2 parts of acetone. Polymerization is carried out for about 5 hours at about 70°C. About 50 parts of 30 percent aqueous formaldehyde are then added. A finely divided, thick 22 percent sol which dries at room temperature to form a soft elastic foil is obtained.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A process for the production of stable aqueous polymer dispersions which comprises polymerizing from about 5 to about 95 percent by weight of at least one polymerizable olefinically unsaturated monomer under free radical forming conditions in the presence of from about 5 to about 95 percent by weight of an oligourethane salt having a tensile strength of less than about 20 kg wt/cm$^2$, a salt group content of 10 to 400 milliequivalents percent based on 100 grams of the salt and prepared by reacting an organic polyisocyanate with an organic compound having at least two groups reactive with NCO groups.

2. The process of claim 1 wherein the oligourethane salt is in the form of an aqueous sol.

3. The process of claim 2 wherein the aqueous sol has a solids content of from about 2 to about 55 percent by weight.

4. The process of claim 1 wherein the oligourethane salt has a tensile strength of less than about 5 kg wt/cm$^2$.

5. The process of claim 1 wherein the oligourethane salt is a cationic compound containing at least one

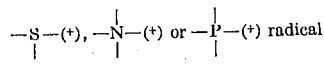

6. The process of claim 1 wherein the oligourethane salt is an anionic compound containing at least one —COO$^{(-)}$, —SO$_3^{(-)}$, —O—SO$_3^{(-)}$, —SO$_2^{(-)}$

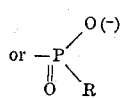

radical in which R is alkyl, cycloalkyl, aralkyl or aryl.

7. The process of claim 1 wherein 10 – 25 percent of the monomers are emulsified in an aqueous sol of the oligourethane and the remainder of the monomers is added after polymerization has been initiated.

8. The process of claim 1 wherein a stable emulsion of the monomers in an oligourethane sol is added to the polymerization mixture.

9. The process of claim 1 wherein water is added and stirred into a mixture of the oligourethane salt and one or more olefinic monomers to form a dispersion and polymerization is then initiated.

10. The process of claim 1 wherein the oligourethane salt is prepared by reacting water insoluble compounds which contain terminal hydroxyl groups and which have a molecular weight of from about 400 to about 5,000 with an organic polyisocyanate at a temperature of from about 20°C to about 160°C.

11. The process of claim 10 wherein the NCO/OH ratio is from about 0.4 to about 0.9 or from about 1.1 to about 2.

12. The process of claim 1 wherein the oligourethane has a viscosity of less than about 1,500 poises at about 120°C.

13. The process of claim 1 wherein the monomer is polymerized at a temperature of from about 0° to about 140°C.

14. The process of claim 1 wherein the polymerization is carried out in the presence of from about 0.05 to about 3 percent by weight based on the weight of the olefin of a polymerization initiator.

15. The process of claim 1 wherein the polymerization is carried out at a pH of from about 2 to about 9.

16. A stable aqueous dispersion prepared by the process of claim 1 containing 5 to 95 percent by weight of oligourethane salts having an average molecular weight of 1500 to 20,000 and a tensile strength of less than 20 kg wt/cm$^2$, which salts have been prepared from water insoluble oligohydroxy compounds having a molecular weight of 400 to 5,000, and 5 to 95 percent by weight of at least one polymerizable olefinically unsaturated monomer.

17. The stable aqueous dispersion of claim 16 having a solids content of from about 20 to about 60 percent by weight.

* * * * *